Figure 1:
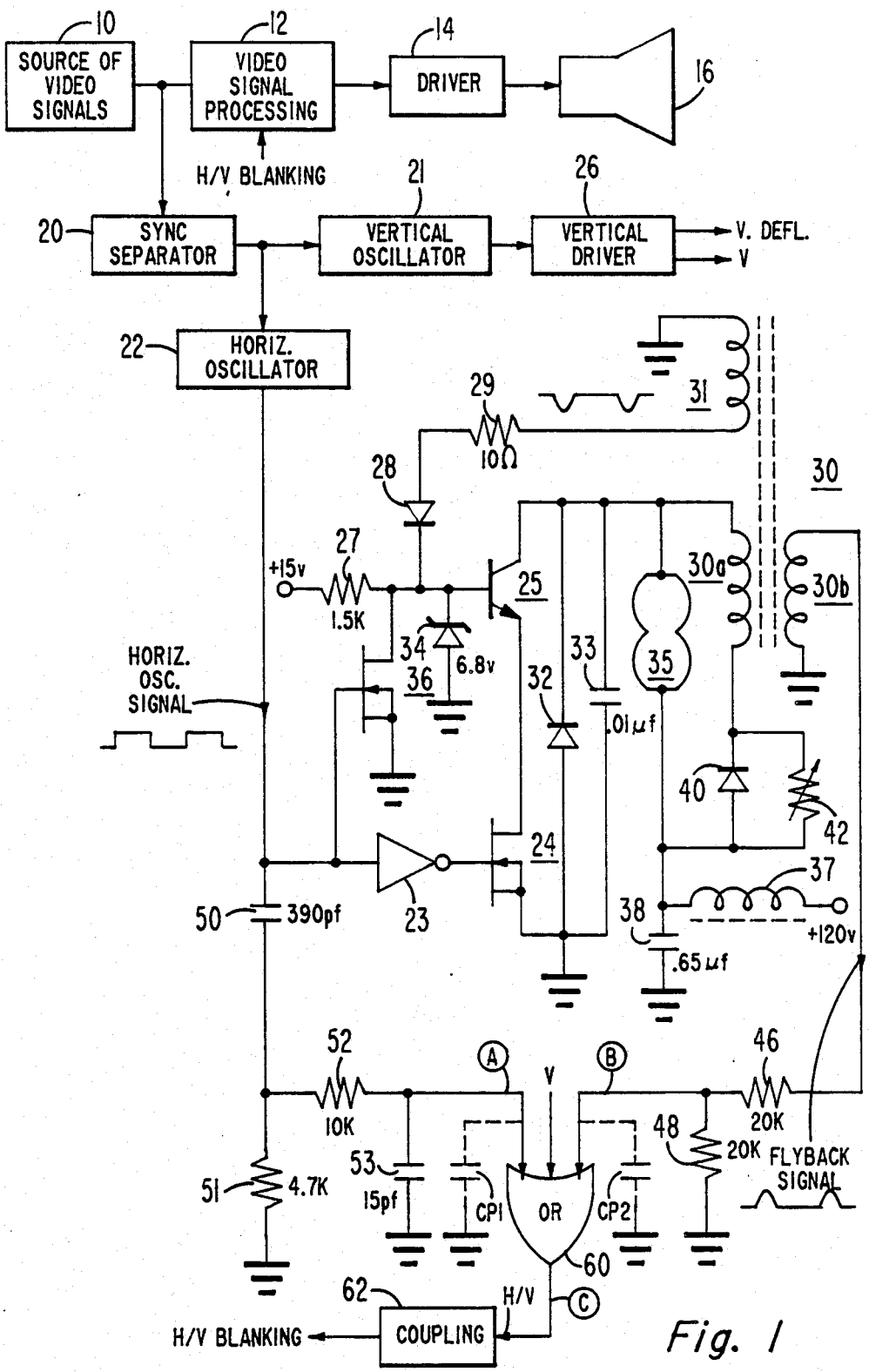

United States Patent [19]

Dietz

[11] Patent Number: 4,652,920
[45] Date of Patent: Mar. 24, 1987

[54] VIDEO IMAGE BLANKING SIGNAL GENERATOR

[75] Inventor: Wolfgang F. W. Dietz, New Hope, Pa.

[73] Assignee: RCA Corporation, Princeton, N.J.

[21] Appl. No.: 778,987

[22] Filed: Sep. 23, 1985

[51] Int. Cl.$^4$ .............................................. H04N 3/24
[52] U.S. Cl. .................................... 358/165; 358/150
[58] Field of Search ............... 358/165, 151, 150, 148; 315/384, 386, 387

[56] References Cited

U.S. PATENT DOCUMENTS 4,213,151 7/1980 Harford .............................. 358/178
4,228,464 10/1980 Duijkers .............................. 358/165

OTHER PUBLICATIONS

Schematic Circuit Diagram of Tektronix Model 690 SR Video Monitor.

Primary Examiner—Tommy P. Chin
Assistant Examiner—David E. Harvey
Attorney, Agent, or Firm—P. J. Rasmussen; P. M. Emanuel; R. H. Kurdyla

[57] ABSTRACT

A video monitor includes apparatus for generating a horizontal blanking pulse accurately timed with respect to a horizontal image retrace interval. The leading edge of the blanking pulse is derived from a differentiated horizontal oscillator signal which is applied to one input of a gate having a threshold operating level. The lagging edge of the blanking pulse is generated when the amplitude of a horizontal flyback pulse applied to another input of the gate falls below the gate threshold level.

7 Claims, 2 Drawing Figures

VIDEO IMAGE BLANKING SIGNAL GENERATOR

This invention concerns apparatus for generating an accurately timed image blanking signal for use in a video signal processing and display system.

Video signal processing and display systems such as television receivers and video monitors conventionally include apparatus for developing blanking signals to blank the display of video information during prescribed intervals, such as horizontal and vertical retrace intervals which occur between line and field image trace intervals, respectively.

In a conventional television receiver, the blanking signal typically is not accurately timed with respect to retrace intervals. A blanking signal which is accurately timed with respect to the retrace interval from the end of one horizontal image display line to the beginning of the next line is not required because the video image is overscanned beyond the visible edges of the display screen, such that image information contained in the overscanned area is not seen by a viewer. The loss of this information to a viewer is not critical due to the nature of the majority of scenes displayed in response to a received broadcast television signal.

However, in some video signal processing and display systems, such as video monitors intended to display all available video information, overscanning is not employed so that valuable information which must be fully displayed, e.g., alphanumeric data, is not lost to the viewer. In such system where the display is not overscanned accurate timing of the blanking signal relative to the retrace interval is important so that information displayed at the end of one horizontal line and at the beginning of the next line is not lost.

In accordance with the principles of the present invention there is disclosed herein a video signal processing and display system including apparatus for generating an image blanking signal which is accurately timed with respect to image retrace intervals. In a disclosed embodiment of the invention, the blanking signal is derived from locally generated image synchronizing timing signals. The leading edge of the blanking signal is derived from a differentiated, locally generated image synchronizing timing signal, and the lagging edge of the blanking signal is generated when the amplitude of a locally generated image synchronizing timing signal reaches a given threshold level.

Figure 2:
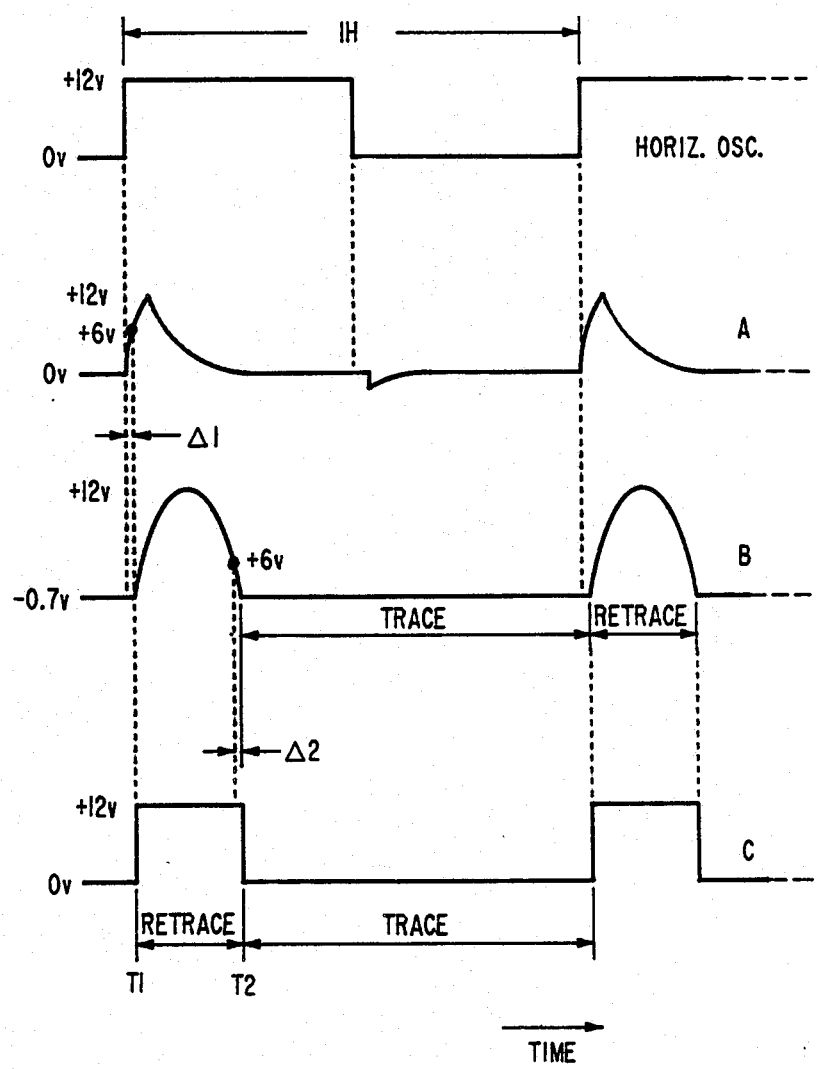

In the drawings:

FIG. 1 shows a portion of a video signal monitor, partly in block form and partly in schematic circuit diagram form, including a blanking signal generator in accordance with the present invention; and FIG. 2 shows signal waveforms helpful in understanding the operation of the blanking signal generator of FIG. 1.

In the video monitor system of FIG. 1, video signals from a source 10 are processed (e.g., amplified, peaked and level shifted) by a unit 12 before being applied to a driver stage 14. Driver 14 provides an output high level amplified video signal suitable for driving an intensity control electrode, e.g., a cathode electrode, of an image displaying kinescope 16.

The video signal from source 10 is also provided to a synchronizing (sync) signal separator 20 which derives an image synchronizing component from the video signal. The output sync signal from unit 20 is applied to a horizontal oscillator 22 and to a vertical oscillator 21 for synchronizing the operation thereof. A vertical driver stage 26 amplifies the vertical oscillator output signal to provide a vertical blanking signal V, and a vertical deflection signal V. DEFL. which is applied to a yoke assembly (not shown) on kinescope 16 to control the vertical scanning of a reproduced image. The output signal from horizontal oscillator 22 is processed as described below.

The horizontal oscillator signal is an image synchronizing horizontal timing signal which, in this example, exhibits a positive going leading edge pulse component synchronously related to the beginning of the horizontal retrace interval. The horizontal oscillator signal is coupled via an inverter 23 to a cascode horizontal driver amplifier including an input lower rank MOSFET device 24 and an output upper rank NPN transistor device 25. At start-up, base bias for transistor 25 is provided by a resistor 27 in association with a +15 volt DC supply. After start-up, steady-state operating bias for the base of transistor 25 is provided by a rectified trace interval voltage developed by a rectifier diode 28, a current limiting resistor 29 and a so-called feedback coil 31 in the primary circuit of a flyback transformer 30. The parallel combination of a trace recovery diode 32 and a retrace capacitor 33, as are known, shunt the output of cascode driver amplifier 24, 25. A 6.8 volt zener diode 34 clamps the base of output transistor 25, and a MOSFET device 36 responsive to the horizontal oscillator signal assists to turn off transistor 25 quickly by reducing base charge. The cascode drive stage with FET input device 24 exhibits significantly less turn-off delay (approximately 200 nanoseconds) compared to a bipolar input transistor device (approximately 2 to 5 microseconds).

A horizontal output signal from the collector of transistor 25 is applied to a horizontal yoke assembly 35, located on kinescope 16, to control the horizontal scanning of a reproduced image. An "S-shaping" capacitor 38 as is known couples one end of yoke assembly 35 to ground. The horizontal output signal is also applied to a primary winding 30a of horizontal flyback transformer 30, from an output secondary winding 30b of which a horizontal flyback signal with a peak-to-peak amplitude of approximately 70 volts is developed. Both the horizontal flyback signal and the horizontal oscillator signal are illustrated in FIG. 2 and will be discussed. subsequently. A regulated DC supply voltage (+120 volts) is coupled to yoke assembly 35 and flyback transformer 30 via an AC signal blocking choke 37. A rectifier diode 40 and an adjustable resistor 42 are coupled to the primary winding of flyback transformer 39. Resistor 42 acts as a centering control to adjust the amount of current conducted by primary winding 30a in known fashion.

A blanking signal generator in accordance with the principles of the present invention is described below in the context of a horizontal blanking signal, with regard to the waveforms of FIG. 2. The uppermost waveform in FIG. 2 represents the square wave horizontal oscillator output signal from oscillator 22 which exhibits a period of one horizontal line (1H). The frequency of the horizontal oscillator signal depends upon the horizontal line scanning rate, which in a video monitor may be much higher than the 15,734 Hz horizontal line rate of a conventional television receiver. Waveform B depicts an attenuated version of the flyback signal produced by a voltage divider including resistors 46 and 48 in FIG. 1. The flyback signal includes a periodic positive-going flyback pulse component developed during each horizontal image retrace blanking interval, between image trace intervals when image information is to be displayed. The positive flyback pulse is initiated by the leading edge of the positive pulse component of the horizontal oscillator signal, which leading edge appears at the beginning of the horizontal retrace interval. As indicated by a signal delay $\Delta 1$, the flyback signal, and in particular the retrace pulse component thereof, is delayed from the horizontal oscillator signal by approximately 200 nanoseconds due to the turn-off delay of cascode driver stage 24, 26 caused by stored charge effects.

The horizontal oscillator timing signal is differentiated by means of a network including a capacitor 50 and a resistor 51. The differentiated oscillator signal is then delayed by an integrating network including a resistor 52, a capacitor 53 and a parasitic capacitance CP1 (e.g., approximately 7 picofarads) associated with an input of an OR logic gate 60. Gate 60 is, for example, contained in the CD 4075 integrated circuit device commercially available from the Solid State Division of RCA Corporation, Somerville, N.J. The delayed, differentiated horizontal oscillator signal is depicted by waveform A in FIG. 2 as having positive pulse components associated with positive-going edges of the horizontal oscillator signal, and smaller negative-going pulse components associated with negative-going edges of the horizontal oscillator signal. The smaller negative-going pulse components are due to the clamping action of an input protection diode of gate 60 (not shown).

Waveform C in FIG. 2 depicts the desired horizontal blanking signal, having a positive blanking pulse component which substantially coincides with the horizontal image retrace interval when the positive flyback pulse is developed. The leading edge of each blanking pulse of signal C, at a time T1, substantially coincides with the beginning of the retrace interval at the onset of the positive flyback pulse. The timing of the leading edge of the blanking signal is determined by the amount by which differentiated waveform A is delayed by the integrating network 52, 53 and CP1, and by the input threshold level of gate 60. Specifically, the amount of delay provided by network 52, 53 is selected so that the amplitude of the positive pulse components of differentiated signal A reaches the input threshold operating level of gate 60 (+6.0 volts) substantially at the onset of the horizontal flyback pulse at time T1. Thus gate 60 conducts to initiate an output horizontal blanking pulse substantially at the beginning of the horizontal retrace interval. Advantageously, the timing of the leading edge of the blanking signal at time T1 can be readily tailored to suit the requirements of a particular system simply by altering the values of elements 52 and 53 to alter the amount of signal delay provided thereby.

The lagging edge of each positive blanking pulse of waveform C, at a later time T2, is substantially coincident with the end of the horizontal retrace interval. The timing of the lagging edge of the blanking pulse is determined by the relationship between the +6.0 volt input threshold level of gate 60 and the magnitude of the attenuated flyback pulse signal as depicted by waveform B, in combination with a signal delay caused by parasitic capacitances at the flyback signal input of gate 60. Specifically, by attenuating the flyback pulse via network 46, 48, the negative going lagging edge of the flyback pulse (waveform B) is caused to exhibit a reduced slope such that a +6.0 volt amplitude level of the flyback pulse (corresponding to the input threshold of gate 60) is reached before the end of the retrace interval, as indicated by a time difference $\Delta 2$ of approximately 100 nanoseconds. Thus the +6.0 volt amplitude level of the lagging edge of the flyback pulse is reached sooner than if the flyback pulse had not been attenuated. The magnitude of time difference $\Delta 2$, a time advance, substantially corresponds to the magnitude of a time delay introduced by a parasitic capacitance CP2 at the flyback signal input of gate 60. Thus the time advance $\Delta 2$ produced with respect to the +6.0 volt amplitude level of the flyback signal accounts for time delays including the time delay introduced by parasitic capacitance CP2, so that the +6.0 volt amplitude level of the flyback pulse substantially coincides with the end of the retrace interval at time T2. At this time gate 60 is rendered nonconductive as the flyback pulse input of gate 60 falls below the input threshold level of gate 60, whereby the negative-going lagging edge of the positive horizontal blanking pulse is developed at the output of gate 60. The timing of the lagging edge of the blanking pulse can be conveniently adjusted simply by altering the values of voltage divider resistors 46 and 48.

In this example a third input of gate 60 receives vertical blanking signal V from vertical driver 26, so that OR gate 60 provides an output vertical blanking signal V during vertical blanking intervals, and a horizontal blanking signal H (waveform C) during horizontal blanking intervals. Output horizontal and vertical blanking signals H, V from gate 60 are conveyed via a coupling network 62, i.e., including buffer and level shifting circuits, to a blanking input of video signal processor 12.

In an alternative embodiment of the invention, a flyback signal from secondary winding 30b of transformer 30, rather than the horizontal oscillator signal, can be applied via differentiating network 50, 51 to an input of gate 60, in which case it many not be necessary to provide delay compensation by means of network 52, 53. Also, the principles of the present invention as described in the context of generating a horizontal blanking signal may also be used to generate a vertical blanking signal.

What is claimed is:

1. In a system for processing a video signal having image trace and retrace intervals, said system including a video signal processor having a video signal input, a video signal output and a blanking signal input, apparatus for generating a retrace blanking signal for application to said blanking signal input, comprising:

a source of a periodic timing signal including a periodic retrace component synchronized with said retrace intervals;

first means, including signal differentiating means responsive to said retrace component, coupled to said timing signal source for providing a differentiated retrace component;

second means coupled to said timing signal source for deriving a periodic signal related in phase to said retrace component and having a prescribed magnitude; and threshold conduction means, having a threshold conduction level, responsive to said differentiated retrace component and to said derived signal for providing at an output said blanking signal with a leading amplitude edge transition produced in response to said differentiated retrace component exhibiting a magnitude exceeding said threshold conduction level in a first direction, exclusive of said derived signal, and a lagging amplitude edge transition produced in response to said derived signal exhibiting a magnitude exceeding said threshold conduction level in a second direction, exclusive of said differentiated retrace component.

2. In a system for processing a video signal having image trace and retrace intervals, said system including a video signal processor having a video signal input, a video signal output and a blanking signal input, apparatus for generating a retrace blanking signal for application to said blanking signal input, comprising:

a source of a timing signal including a retrace component synchronized with said retrace intervals;

gating means having an input circuit, an output, and a threshold operating level;

first means, including signal differentiating means responsive to said retrace component, coupled to said timing signal source for providing at an output of said first means a differentiated retrace component having a first prescribed magnitude with respect to said threshold level of said gating means;

means for coupling said differentiated retrace component to said input circuit of said gating means;

second means coupled to said timing signal source for providing at an output said retrace component with a second prescribed magnitude with respect to said threshold level of said gating means; and means for coupling said retrace component from said output of said second means to said input circuit of said gating means; wherein said gating means exhibits one conductive state for developing a leading edge of said blanking signal at said output thereof in response to said differentiated retrace component exclusive of said retrace component from said output of said second means, and another conductive state for developing a lagging edge of said blanking signal at said output thereof in response to said retrace component from said output of said second means exclusive of said differentiated retrace component.

3. Apparatus according to claim 2, wherein said gating means exhibits said one conductive state when said retrace component from said output of said first means exhibits a magnitude exceeding said threshold level of said gating means in one direction; and said gating means exhibits said other conductive state when said retrace component from said output of said second means exhibits a magnitude exceeding said threshold level of said gating means in an opposite direction.

4. Apparatus according to claim 2, wherein said video signal includes a synchronizing component;

said timing signal is a horizontal oscillator signal produced by a horizontal oscillator responsive to said synchronizing component; and said second means responds to a horizontal flyback signal derived by said timing signal source.

5. Apparatus according to claim 4, wherein said means for coupling said differentiated retrace component includes signal delaying means.

6. Apparatus according to claim 4, wherein said gating means is a logic OR gate.

7. Apparatus according to claim 2, wherein said video signal includes a synchronizing component;

said timing signal is a horizontal oscillator signal produced by a horizontal oscillator included in said timing signal source and responsive to said synchronizing component;

said first means includes a differentiating circuit responsive to said horizontal oscillator signal for providing at said output of said first means said differentiated retrace component including a differentiated amplitude component associated with the beginning of said retrace interval;

said second means responds to a retrace pulse component of a horizontal flyback signal derived by said timing signal source for providing an amplitude attenuated version of said retrace pulse component of said horizontal flyback signal at said output of said second means; and said gating means is a logic OR circuit and said input circuit of said gating means includes a first input for receiving said signal from said output of said first means, and a second input for receiving said amplitude attenuated version of said retrace pulse component from said output of said second means.

* * * * *